United States Patent
Kato

(10) Patent No.: US 8,465,676 B2
(45) Date of Patent: Jun. 18, 2013

(54) PHOSPHOR FOR LOW-VOLTAGE ELECTRON BEAM AND VACUUM FLUORESCENT DISPLAY APPARATUS

(75) Inventor: Koji Kato, Mie (JP)

(73) Assignees: Noritake Itron Corporation, Mie (JP); Noritake Co., Limited, Aichi (JP)

( * ) Notice: Subject to any disclaimer, the term of this patent is extended or adjusted under 35 U.S.C. 154(b) by 130 days.

(21) Appl. No.: 12/932,136

(22) Filed: Feb. 17, 2011

(65) Prior Publication Data

US 2011/0215708 A1 Sep. 8, 2011

(30) Foreign Application Priority Data

Mar. 3, 2010 (JP) ................................. P2010-046654

(51) Int. Cl.
*C09K 11/08* (2006.01)
*C09K 11/54* (2006.01)
*C09K 11/66* (2006.01)

(52) U.S. Cl.
USPC ........ 252/301.4 F; 252/301.6 F; 252/301.6 R

(58) Field of Classification Search
USPC ....... 252/301.4 R, 301.6 R, 301.6 F, 301.4 F; 313/486, 487, 495, 496, 503
See application file for complete search history.

(56) References Cited

U.S. PATENT DOCUMENTS

| | | | | |
|---|---|---|---|---|
| 5,723,224 | A * | 3/1998 | Toki et al. | 428/570 |
| 7,071,609 | B2 * | 7/2006 | Tsuji et al. | 313/496 |
| 2006/0237690 | A1 * | 10/2006 | Tsuji et al. | 252/301.608 |

FOREIGN PATENT DOCUMENTS

| | | | |
|---|---|---|---|
| JP | 55-131083 | A | 10/1980 |
| JP | 01-149888 | A | 6/1989 |
| JP | 08-085788 | | 4/1996 |
| JP | 08-283709 | | 10/1996 |
| JP | 09-255962 | A | 9/1997 |
| JP | 10-067985 | A | 3/1998 |
| JP | 2001-226670 | A | 8/2001 |
| JP | 2002-373599 | A | 12/2002 |
| JP | 2003-041246 | A | 2/2003 |
| JP | 2003-064356 | A | 3/2003 |
| JP | 2004238549 | A * | 8/2004 |
| JP | 2005-281507 | | 10/2005 |
| JP | 2005-281508 | | 10/2005 |
| JP | 2006-335898 | | 12/2006 |
| JP | 2007-031563 | A | 2/2007 |
| JP | 2009-242735 | | 10/2009 |
| JP | 2009-298997 | | 12/2009 |

OTHER PUBLICATIONS machine translation of JP2004-238549A.*

* cited by examiner

*Primary Examiner* — Emily Le
*Assistant Examiner* — Lynne Edmondson
(74) *Attorney, Agent, or Firm* — Hedman & Costigan, P.C.; James V. Costigan

(57) ABSTRACT

In order to provide a phosphor for a low-voltage electron beam and a vacuum fluorescent display apparatus in which the phosphor is used, a deposition layer is formed on a surface of a main body of a phosphor shown by the following chemical formula (1), the deposition layer being a plurality of oxide layers sequentially deposited on the surface of the phosphor main body. The phosphor for a low-voltage electron beam contains no cadmium, but has exceptional high-temperature exposure characteristics, as well as prolonged service life and higher brightness.

$$Ca_{1-x}Sr_xTiO_3:Pr,M \quad (1)$$

where M is at least one element selected from Al, Ga, In, Mg, Zn, Li, Na, K, Gd, Y, La, Cs, and Rb; and $0 \leqq x \leqq 1$.

10 Claims, 4 Drawing Sheets

PHOSPHOR FOR LOW-VOLTAGE ELECTRON BEAM AND VACUUM FLUORESCENT DISPLAY APPARATUS

BACKGROUND OF THE INVENTION

1. Field of the Invention

The present invention relates to a phosphor for a low-voltage electron beam and to a vacuum fluorescent display apparatus in which the phosphor is used.

2. Description of the Related Art

Cadmium-sulfide-based phosphors have conventionally been used as a red phosphor to be excited by a low-voltage electron beam. However, cadmium has been restricted from use due to environmental problems because it is a hazardous element, and there is a need for a red phosphor that does not include cadmium. $SrTiO_3$:Pr, $CaTiO_3$:Pr, and the like have been conventionally known as phosphors that do not include cadmium, but these phosphors are problematic in that they suffer from severe brightness degradation, short phosphor service life, and poor initial brightness.

Accordingly, there have been proposed (1) methods for forming a solid solution of a second additive as an activator in a phosphor matrix as a method for improving the initial brightness of a $CaTiO_3$:Pr,M phosphor (Japanese Laid-open Patent Application Nos. 2005-281507, 2005-281508, 8-85788, and 2009-298997); (2) methods for forming a metal oxide layer on the surface of a phosphor as a method for preventing brightness degradation in a phosphor having a matrix composed of an alkaline-earth metal and an oxide (Japanese Laid-open Patent Application No. 8-283709); (3) methods for depositing a tin compound, which is changed into an oxide by heat treatment, onto the surface of the phosphor particles as a method for improving the service life characteristics without a considerable reduction in the initial brightness of the phosphor (Japanese Laid-open Patent Application No. 2006-335898); and (4) methods for increasing brightness without obstructing the emission of light from other rare earth elements by further adding any among Gd, La, and Y as a third additive to the phosphor matrix in a $CaTiO_3$:Pr,Zn,Li phosphor (Japanese Laid-open Patent Application No. 2009-242735).

SUMMARY OF THE INVENTION

Problems to be Solved by the Invention

However, in the method (1) described above, initial brightness is improved, but the initial brightness of $CaTiO_3$:Pr is equal to or less than that of a conventional ZnCdS-based phosphor, and further improvement in brightness is required for practical application.

Although the initial brightness of $SrTiO_3$:Pr achieves a level for practical application, there is a problem in that brightness degradation is severe and the brightness service life is short. The method (2) described above was proposed for this reason, but a problem is presented in that the brightness service life is not improved over that of a conventional ZnCdS-based phosphor. Another problem is presented in that brightness is reduced when the thickness of the metal oxide layer formed on the surface of the phosphor is increased in order to extend the service life.

Method (3) described above has a further problem in that the amount of tin compound deposited must be increased in order to improve the brightness service life, and the brightness is reduced when a large amount is deposited.

Method (4) described above improves initial brightness but may not be able to achieve a satisfactory service life.

In the case of any of (1) to (4) described above, it is difficult to achieve a satisfactory level of applicability in terms of both a brightness service life and initial brightness of the phosphor.

$SrTiO_3$:Pr and $CaTiO_3$:Pr present problems in that the high-temperature exposure characteristics are reduced by forming the metal oxide layer, high-temperature exposure being a characteristic where the phosphor is exposed to a high temperature; e.g., 80° C. or higher. In particular, the high-temperature exposure characteristics are degraded at higher metal oxide layer thicknesses.

An object of the present invention is to provide a phosphor for a low-voltage electron beam, the phosphor containing no cadmium, but having excellent high-temperature exposure characteristics, as well as prolonged service life and higher brightness; and to provide a vacuum fluorescent display apparatus in which the phosphor is used.

Means Used to Solve the Above-Mentioned Problems

According to the phosphor for a low-voltage electron beam of the present invention, a deposition layer is formed on a surface of the main body of a phosphor shown by the following chemical formula (1), and the deposition layer is a plurality of oxide layers layered on a surface of the phosphor main body.

$$Ca_{1-x}Sr_xTiO_3:Pr,M \qquad (1)$$

In chemical formula (1), M is at least one element selected from Al, Ga, In, Mg, Zn, Li, Na, K, Gd, Y, La, Cs, and Rb; and $0 \leq x \leq 1$.

According to the phosphor for a low-voltage electron beam of the present invention, a single oxide layer among a plurality of oxides layered in sequence on the surface of the phosphor main body is a layer of an oxide (MO1) of at least one element selected from Gd, Pr, Y, Zn, Ta, and Sr; another oxide layer is a layer of an oxide (MO2) of at least one element selected from Si, Al, Mo, Sb, and Ce; and another oxide layer is layer of an oxide (MO3) of at least one element selected from Ti, W, and Zr.

A more particular characteristic is that the oxide (MO3) layer is the outermost layer of the deposition layer, and the oxide (MO2) and the oxide (MO3) are used in combination.

Unless otherwise stated, the "low-voltage electron beam" in the present specification refers to an electron beam that is suitable for a vacuum fluorescent display apparatus and is accelerated at a voltage of about 10 to 200 V.

According to the vacuum fluorescent display apparatus of the present invention, a low-voltage electron beam is injected into a layer of the phosphor for a low-voltage electron beam of the present invention described above to cause the phosphor layer to emit light, the phosphor layer being formed inside a vacuum vessel.

Effect of the Invention

According to the phosphor for a low-voltage electron beam of the present invention, a plurality of oxide layers are layered in sequence on the surface of the phosphor main body shown by the chemical formula (1) in which titanate is used as a matrix, whereby service life can be dramatically improved and high-temperature exposure characteristics improved without a reduction in initial brightness.

DETAILED DESCRIPTION OF THE INVENTION

Figure 1:
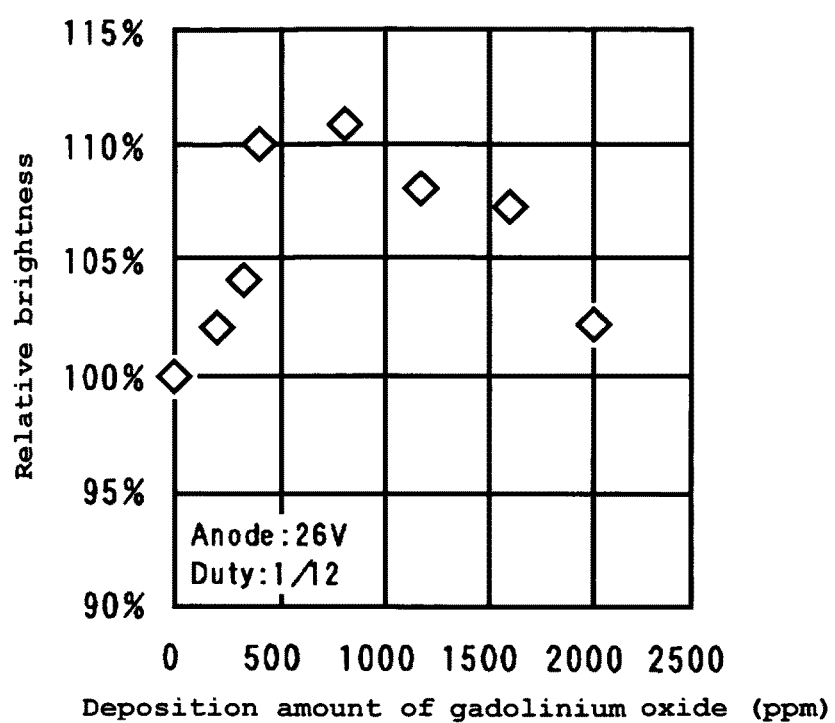
FIG. 1 is a diagram showing the relationship between the initial brightness and the deposition amount of gadolinium oxide.

A phosphor with a titanate matrix experiences reduced brightness owing to carbon in residual gas inside the vacuum fluorescent display apparatus, barium generated from a getter and/or cathode, or another factor. Carbon, barium, and other elements that cause such adverse effects must be blocked from making contact with the phosphor inside the vacuum fluorescent display apparatus in order to prevent brightness degradation. An example of a method for achieving such blocking is to apply a metal oxide coating onto the surface of the phosphor. The adverse effect on the brightness of emitted light becomes more pronounced at greater thicknesses of the coated deposition layer and when a larger number of types of deposition layers are used.

Also, the high-temperature exposure characteristics of the phosphor may be worsened when a metal oxide layer is provided. Presumably this is because residual gases derived from moisture, carbon, or other substances inside the apparatus float freely and the metal oxide layer promotes the deposition of these gases on the surface of the phosphor by having the vacuum fluorescent display apparatus exposed to high temperatures.

However, it was found that by sequentially layering a plurality of oxide layers of specific elements on the surface of the phosphor main body shown by the chemical formula (1), the phosphor is imparted with greater brightness and a longer service life, and has excellent high-temperature exposure characteristics. The present invention is based on these findings.

The main body of the phosphor for a low-voltage electron beam that can be used in the present invention is shown by the chemical formula (1).

The phosphor main body shown by the chemical formula (1) has $Ca_{1-x}Sr_xTiO_3$ as a matrix, where $0 \leq x \leq 1$. In the case that x=0, the matrix is $CaTiO_3$; and in the case that x=1, the matrix is $SrTiO_3$.

In the present invention, unless particularly specified, a stoichiometric composition is not necessarily limited to one in which the Ca/Ti ratio or the Sr/Ti ratio is 1 in the case of $CaTiO_3$ or $SrTiO_3$, and includes compositions in which the ratio is slightly greater than or slightly less than 1. For example, compositions with a ratio in the range of 1.05 to 0.95 are included. Pr, which functions as a light emission center, is added as a required additive to the matrix of the phosphor. Pr has a valence of +3 or +4 (+3 in the particular case of red light emission) and is presumably substituted in the Ca site or Sr site in view of the ionic radius, but since the valence of Ca or Sr is +2, a surplus positive charge results from the substitution.

In chemical formula (1), M is at least one element selected from Al, Ga, In, Mg, Zn, Li, Na, K, Gd, Y, La, Cs, and Rb. The charge, which has shifted to the surplus side due to Pr substitution, can be re-balanced by adding these elements. For example, Zn may be substituted into the Ti site in view of the ionic radius, and since the valence of Ti is +4 and the valence of Zn is +2, the charge, which has shifted to the surplus side due to Pr substitution, can be re-balanced. Also, Li may be substituted into the Ca or Sr site in view of the ionic radius, but since the valence of Li is +1, the charge balance, which has moved to the surplus side due to Pr substitution, can be restored even if such a substitution has been performed. M can thus increase the brightness by stabilizing the presence of Pr.

Preferred examples of the phosphor main body shown by the chemical formula (1) include $CaTiO_3$:Pr,Zn,Li; $SrTiO_3$:Pr,Al; and the like.

According to the phosphor of the present invention, a plurality of oxide layers are sequentially layered and deposited on the surface of the phosphor main body.

One of the plurality of oxide layers is an oxide (MO1) layer having at least one element selected from Gd, Pr, Y, Zn, Ta, and Sr; another is an oxide (MO2) layer having at least one element selected from Si, Al, Mo, Sb, and Ce; and yet another is an oxide (MO3) layer having at least one element selected from Ti, W, and Zr.

The oxide (MO1) layer is a brightness intensifying layer that improves the initial brightness of the phosphor main body. In particular, the Gd, Pr, Y, Zn, Ta, or Sr oxide can improve the initial brightness of the phosphor main body shown by the chemical formula (1).

In the particular case that $CaTiO_3$ is used as the titanate matrix, it was found that the effect of improving the initial brightness is considerable, and the effect of the brightness intensifying layer composed of an oxide of Gd or Y is significant.

The reason for the improvement in the initial brightness is not clear, but it is thought that the initial brightness is improved by the brightness intensifying layer because quantum theoretical resonance is generated between the deposited elements and the Pr, which is the light emission center of the phosphor; energy is transmitted; and an intensifying effect is produced.

Gadolinium oxide (reference example 2), praseodymium oxide (reference example 3), yttrium oxide (reference example 4), zinc oxide (reference example 5), tantalum oxide (reference example 6), and strontium titanate (reference example 7) were formed according to the following method as examples of the oxide (MO1) on the surface of the $CaTiO_3$: Pr,Zn,Li phosphor; and the initial brightness and brightness service life of the phosphors were measured. Reference example 1 is a $CaTiO_3$:Pr,Zn,Li phosphor on which an oxide layer has not been deposited.

Organometallic compounds containing the following materials were used in the reference examples and examples described below.

Organic gadolinium compound: Hautform RD-Gd, manufactured by Fuji Kagaku Corp.

Organic praseodymium compound: Pr-O3 $Pr_2O_3$ Coating Material, manufactured by Kojundo Chemical Laboratory Co., Ltd.

Organic yttrium compound: SYM-YO1 $YO_{1.5}$ Coating Material, manufactured by Kojundo Chemical Laboratory Co., Ltd.

Organic zinc compound: DMZ (dimethyl zinc), DEZ (diethyl zinc), manufactured by Shin-Etsu Chemical Co., Ltd.

Organic tantalum compound: SYM-TAO5 $TaO_{2.5}$ Coating Material, manufactured by Kojundo Chemical Laboratory Co., Ltd.

Organic titanium compound: SYM-TIO5 $TiO_2$ Coating Material, manufactured by Kojundo Chemical Laboratory Co., Ltd.

Organic silicon compound: SYM-SIO5 $SiO_2$ Coating Material, manufactured by Kojundo Chemical Laboratory Co., Ltd.

Organic aluminum compound: Hautform RD-Al, manufactured by Fuji Kagaku Corp.

Organic molybdenum compound: Hautform RD-Mo, manufactured by Fuji Kagaku Corp.

Organic antimony compound: SYM-SBO3 $SbO_{1.5}$ Coating Material, manufactured by Kojundo Chemical Laboratory Co., Ltd.

Organic cerium compound: Hautform RD-Ce, manufactured by Fuji Kagaku Corp.

Organic tungsten compound: SYM-WO5 $WO_3$ Coating Material, manufactured by Kojundo Chemical Laboratory Co., Ltd.

Organic zirconium compound: SYM-ZRO4 $ZrO_2$ Coating Material, manufactured by Kojundo Chemical Laboratory Co., Ltd.

A phosphor shown by $CaTiO_3$:Pr,Zn,Li was immersed in a solution obtained by diluting an organometallic compound in an organic solvent, and the organic solvent was then evaporated to deposit the organometallic compound on the surface of the phosphor. The organic solvent used to dilute the organometallic compound may be suitably selected from among ethanol, methanol, terpineol, isopropyl alcohol, and the like. The deposited organometallic compound was heated at 400° C. to 600° C. and thereby converted to a metal oxide, and a phosphor in which a metal oxide layer is formed on the surface was obtained.

The amount of metal oxide deposited was 400 ppm in relation to the phosphor main body. The resulting phosphor was mounted in a vacuum fluorescent display apparatus and subjected to aging treatment for five hours at an anodic voltage of 50 V and a duty of 1/20, after which the initial brightness was measured. The initial brightness is indicated by relative comparison in which the initial brightness of the reference example 1 is 100%. The brightness service life is shown as brightness persistence (%) where the initial brightness of the phosphors is 100%, and is simultaneously shown as persistence after 1500 hours of lighting. The initial brightness and brightness persistence are similarly displayed hereinbelow. The lighting was carried out at an anodic voltage of 26V and a duty of 1/12. The results are shown in Table 1.

TABLE 1

|  | Oxide (MO1) | Deposition amount | Initial brightness | Persistence after 1500 h |
|---|---|---|---|---|
| Reference example 1 | — | — | 100% | 53% |
| Reference example 2 | Gadolinium oxide | 400 ppm | 110% | 57% |
| Reference example 3 | Praseodymium oxide | 400 ppm | 108% | 51% |
| Reference example 4 | Yttrium oxide | 400 ppm | 112% | 52% |
| Reference example 5 | Zinc oxide | 400 ppm | 107% | 54% |
| Reference example 6 | Tantalum oxide | 400 ppm | 106% | 55% |
| Reference example 7 | Strontium titanate | 400 ppm | 104% | 52% |

The initial brightness is improved and a brightness intensifying effect is exhibited as shown in Table 1 by providing a deposition layer composed of Gd, Pr, Y, Zn, Ta, and Sr oxide (MO1) on the $CaTiO_3$:Pr,Zn,Li phosphor. However, the brightness service life characteristics indicated by the brightness persistence after 1500 hours of lighting was substantially the same as with the phosphor main body.

The oxide (MO1) contributes to the improvement in the initial brightness when deposited on the phosphor main body shown by chemical formula (1).

Gadolinium oxide, used as an example of the oxide (MO1), was formed using the following method on the $CaTiO_3$:Pr, Zn,Li; and the relationship between the deposition amount and the initial brightness was measured.

A phosphor shown by $CaTiO_3$:Pr,Zn,Li was immersed in a solution obtained by diluting an organic gadolinium compound in ethanol, and the ethanol was then evaporated to deposit the organic gadolinium compound on the surface of the phosphor. The deposited organic gadolinium compound was heated at 400° C. to 600° C. to change the compound into gadolinium oxide and obtain a phosphor in which a gadolinium oxide layer is formed on the surface. The amount of gadolinium oxide was varied from 0 to 2000 ppm in relation to the phosphor. The resulting phosphor was mounted in a vacuum fluorescent display apparatus and the initial brightness was measured. Lighting was carried out at an anodic voltage of 26 V and a duty of 1/12. The results are shown in FIG. 1.

The amount of the oxide (MO1) deposited is 200 to 2000 ppm with respect to the phosphor main body shown by the chemical formula (1), is preferably 300 to 1700 ppm, and is more preferably 400 to 800 ppm, as shown in FIG. 1. At less than 200 ppm, the brightness is not improved, and when 2000 ppm is exceeded, the brightness begins to be reduced. The example described above refers to a case in which gadolinium oxide is deposited, but the same tendency is exhibited with other oxides (MO1) as well.

The oxide (MO2) and the oxide (MO3) are protective layers of the phosphor main body. The protective layer is capable of shielding the phosphor main body from carbon and barium that cause degradation in the phosphor main body, and can prevent degradation of the phosphor and improve service life.

Silicon oxide (reference example 8), aluminum oxide (reference example 9), molybdenum oxide (reference example 10), antimony oxide (reference example 11), and cerium oxide (reference example 12) were formed at 400 ppm with respect to the phosphor using the same method as the method of reference example 2 described above as examples of the oxide (MO2) on the surface of the $CaTiO_3$:Pr,Zn,Li phosphor; and titanium oxide (reference example 13), tungsten oxide (reference example 14), and zirconium oxide (reference example 15) were formed at 400 ppm with respect to the phosphor using the same method as the method of reference example 2 described above as examples of the oxide (MO3) on the surface of the $CaTiO_3$:Pr,Zn,Li phosphor. The initial brightness and high-temperature exposure characteristics of the phosphors were measured. The organometallic compounds used in reference examples 8 to 15 were dissolved in ethanol.

The resulting phosphors were mounted in a vacuum fluorescent display apparatus and the initial brightness and service life were measured in the same manner as with reference examples 1 to 7 described above. The results are shown in Table 2. The brightness persistence after 96 hours of residence in a temperature atmosphere of 85° C. is also shown. The brightness persistence of the high-temperature exposure characteristics is a value obtained when the brightness prior high-temperature exposure is taken to be 100%.

TABLE 2

|  | Oxide | Deposition amount | Initial brightness | Persistence after 1500 h | Brightness persistence after 96 h at 85° C. |
|---|---|---|---|---|---|
| Reference example 1 | — | — | 100% | 53% | 79% |
| Reference example 8 | Silicon oxide | 400 ppm | 86% | 83% | 66% |
| Reference example 9 | Aluminum oxide | 400 ppm | 100% | 72% | 62% |
| Reference example 10 | Molybdenum oxide | 400 ppm | 86% | 64% | 40% |
| Reference example 11 | Antimony oxide | 400 ppm | 97% | 62% | 80% |

TABLE 2-continued

| | Oxide | Deposition amount | Initial brightness | Persistence after 1500 h | Brightness persistence after 96 h at 85° C. |
|---|---|---|---|---|---|
| Reference example 12 | Cerium oxide | 400 ppm | 41% | 102% | 34% |
| Reference example 13 | Titanium oxide | 400 ppm | 80% | 54% | 91% |
| Reference example 14 | Tungsten oxide | 400 ppm | 95% | 58% | 93% |
| Reference example 15 | Zirconium oxide | 400 ppm | 99% | 57% | 85% |

Initial brightness is not improved over that observed in reference example 1 but the service life characteristics indicated by the brightness persistence after 1500 hours of lighting is improved by about 10% or more over the phosphor main body by providing a deposition layer composed of a Si, Al, Mo, Sb, or Ce oxide (MO2) on a $CaTiO_3$:Pr,Zn,Li phosphor, as shown in Table 2.

Among the protective layers described above, the oxide (MO3) having at least one element selected from Ti, W, and Zr was found to have excellent high-temperature exposure characteristics. This is presumably because moisture and residual gas inside the vacuum fluorescent display apparatus are adsorbed on the protective layers and prevented from adhering to the phosphor main body.

Accordingly, the oxide (MO3) is preferably formed on the outermost layer of the deposition layer.

The protective layers may be a single oxide (MO2) or oxide (MO3), but the oxide (MO2) and the oxide (MO3) are preferably used combination.

The deposition concentration of silicon oxide as an example of the oxide (MO2) as a protective layer on the $CaTiO_3$:Pr,Zn,Li is varied from 0 to 1600 ppm (reference examples 8-1 to 8-5) and deposited in the same manner as with reference example 8; and the initial brightness and brightness service life were measured. The results are indicated in Table 3. Reference examples 8 and 8-3 are the same example.

TABLE 3

| | Deposition amount of silicon oxide | Initial brightness | Persistence after 1500 h |
|---|---|---|---|
| Reference example 1 | 0 ppm | 100% | 53% |
| Reference example 8-1 | 50 ppm | 95% | 60% |
| Reference example 8-2 | 200 ppm | 94% | 69% |
| Reference example 8-3 | 400 ppm | 86% | 83% |
| Reference example 8-4 | 800 ppm | 70% | 90% |
| Reference example 8-5 | 1600 ppm | 62% | 74% |

The initial brightness is reduced as the deposition amount of silicon oxide is increased, as shown in Table 3. On the other hand, the service life characteristics tend to improve as the deposition amount is increased to about 1000 ppm, and the brightness characteristics are reduced thereafter.

The high-temperature exposure characteristics tend to be improved as the deposition amount of tungsten oxide serving as the oxide (MO3) is increased in the outermost layer, as observed in examples 26 to 28 described later. This tendency is similarly observed in relation to titanium oxide and zirconium oxide as well. However, the initial brightness starts to decrease when the amount of tungsten oxide deposited is 3000 ppm.

The total amount of the oxide (MO2) and the oxide (MO3) deposited is 50 to 3400 ppm with respect to the entire amount of the phosphor main body shown by the chemical formula (1). At less than 50 ppm, the service life characteristics or the high-temperature exposure characteristics are not improved, and when 3400 ppm is exceeded, brightness is reduced. The amount of the oxide (MO2) deposited is preferably 50 to 2000 ppm, and more preferably 200 to 600 ppm; and the amount of the oxide (MO3) deposited is 400 to 3000 ppm, and preferably 500 to 1500 ppm.

The effects of oxide deposition were investigated in relation to the phosphor main body shown by $SrTiO_3$:Pr,Al in place of $CaTiO_3$:Pr,Zn,Li.

The phosphor main body shown by $SrTiO_3$:Pr,Al was immersed in a solution obtained by diluting an organic gadolinium compound in ethanol, and the ethanol was then evaporated to thereby deposit the organic gadolinium compound on the surface of the phosphor. The deposited organic gadolinium compound was heated at 400° C. to 600° C. to change the compound into gadolinium oxide and obtain a brightness intensifying layer. The amount of gadolinium oxide deposited was 400 ppm in relation to the phosphor. This example is reference example 17.

Other than using an organic silicon compound in place of the organic gadolinium compound, a phosphor was similarly obtained using the same conditions as with reference example 17. This example is reference example 18.

The fabricated phosphors were mounted in a vacuum fluorescent display apparatus and subjected to aging treatment for five hours at an anodic voltage of 50 V and a duty of $\frac{1}{20}$, after which the initial brightness was measured. Measurements were carried out at an anodic voltage of 26 V and a duty of $\frac{1}{12}$. The results are shown in Table 4. Reference example 16 corresponds to a $SrTiO_3$:Pr,Al phosphor main body.

TABLE 4

| | Oxide (MO1, MO2) | Deposition amount | Initial brightness | Persistence after 100 h |
|---|---|---|---|---|
| Reference example 16 | — | — | 100% | 61% |
| Reference example 17 | Gadolinium oxide | 400 ppm | 112% | 54% |
| Reference example 18 | Silicon oxide | 400 ppm | 158% | 79% |

The initial brightness is improved when gadolinium oxide is deposited on a phosphor having $SrTiO_3$ as a matrix, as shown in Table 4. The service life characteristics are improved when silicon oxide is deposited. In particular, when silicon oxide is deposited, the initial brightness is also improved and an excellent improvement effect is obtained.

The same effect as with a phosphor having $CaTiO_3$ as a matrix can be obtained in a phosphor having $SrTiO_3$ as a matrix by forming an oxide layer that provides a brightness intensifying effect and an oxide layer that has the effect of improving service life and high-temperature exposure characteristics. Similarly, the same effect can be obtained using the phosphor shown by the chemical formula (1) as the matrix.

With the oxide (MO1) layer alone, which has a brightness intensifying effect, the service life characteristics are poor; and when providing the oxide (MO2) layer and/or oxide (MO3) layer alone, which have service life improvement effects, the initial brightness may not be improved, as shown in reference examples 1 to 15. The present inventors found that it is possible to improve the service life characteristics together with the initial brightness by layering and synergistically depositing an oxide layer that has a brightness intensifying effect and an oxide layer that has a service life improvement effect. Service life characteristics and high-temperature exposure characteristics can be improved merely by depositing an oxide (MO2) and an oxide (MO3) in the case that the initial brightness is the same as that of the phosphor main body and no practical complications are presented.

The plurality of layers of the oxide deposited on the surface of the phosphor main body are formed in a layering sequence that satisfies the initial brightness, brightness service life, and high-temperature exposure characteristics of the phosphor main body shown by the chemical formula (1).

A total of 12 sequences can be used as the layering sequence of the oxide layers as long as there is no duplication of layers. Particularly preferred examples of the layering sequence include (i) oxide (MO1)-oxide (MO2)-oxide (MO3), (ii) oxide (MO2)-oxide (MO1)-oxide (MO3), and (iii) oxide (MO2)-oxide (MO3), with respect to the phosphor surface.

The method for forming the oxide (MO1), oxide (MO2), and oxide (MO3) layers can be any method whereby each of the layers is formed in sequence. Here, it is possible to determine whether the layers have been sequentially layered by analyzing the elements detected from the surface of the phosphor using XPS (X-ray photoelectron spectroscopy), AES (Auger electron spectroscopy), TEM (transmission electron microscope), or another technique. The layering sequence can be confirmed by performing etching using Ar ions or the like and performing measurements in the depth direction. According to the present invention, in sequential layering, it is not required that the upper layer cover the entire surface of the lower layer; it is also possible for the upper layer to be formed on a portion of the surface of the lower layer.

An example of the method for layering oxides in sequence is a method in which a single oxide layer is formed on the surface of the phosphor main body and the next oxide layer is formed thereafter.

Examples of methods for forming an oxide layer include (i) a method for depositing on the surface of the phosphor main body a liquid-phase compound capable of forming an oxide or a compound dissolved by a solvent to assume a liquid-phase state, and thereafter forming an oxide by heat treatment; (ii) a method for mixing a prepared phosphor paste with a liquid-phase compound capable of forming an oxide, and depositing the oxide on the surface of the phosphor by a heat treatment; (iii) a method for depositing on the surface of the phosphor main body a solution in which an oxide powder has been dispersed in a solvent, and thereafter removing the solution; and (iv) a method for mixing a prepared phosphor paste with an oxide powder, and depositing the oxide on the surface of the phosphor.

The plurality of oxide layers may be applied using a combination of these methods.

Examples of the liquid-phase compound that can form an oxide by heat treatment include the organometallic compounds described above, as well as metal alcoholate, metal alkoxide, metal acetylacetonate, and the like. Examples other than organometallic compounds include metal chlorides, hydroxides, sulfides, fluorides, iodides, nitrates, or the like dissolved in water, alcohol, or another organic solvent to obtain a solution.

The organic solvent used to dissolve the metal compound should be one that readily volatilizes by a drying treatment; e.g., methanol, ethanol, terpineol, propanol, and isopropanol. The heat treatment is carried out at 300 to 1000° C., and preferably 400 to 600° C.

The phosphor paste may be obtained by dispersing in a predetermined vehicle a phosphor having none of the deposited oxide layers or a phosphor having oxide layers deposited according to (i) or (iii) above. An oxide layer may be deposited on the surface of the phosphor using (ii) or (iv) described above.

Forming a plurality of oxide layers selected from an oxide (MO1), an oxide (MO2), and an oxide (MO3) on the surface of the phosphor main body shown by the chemical formula (1) enables the phosphor of the present invention to provide higher brightness as well as a longer service life, and can improve the high-temperature exposure characteristics.

Figure 2:
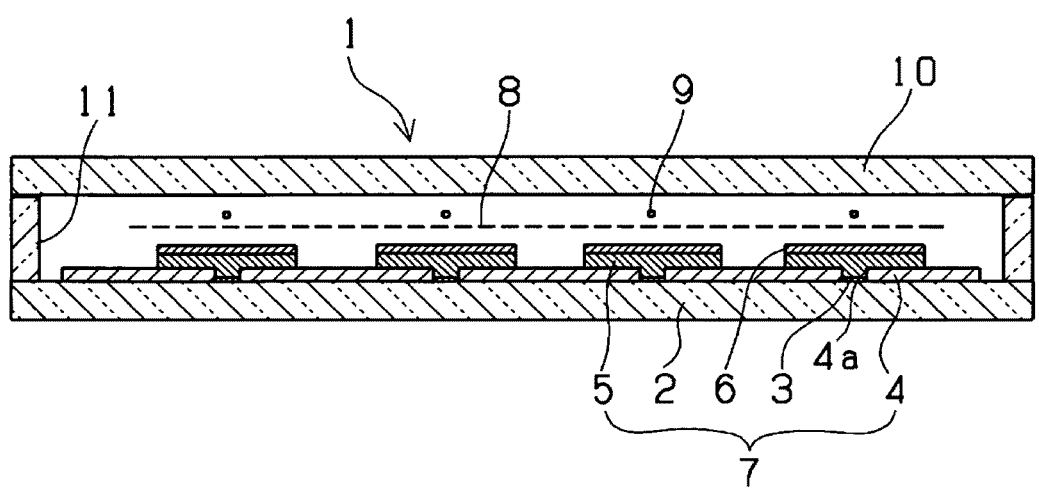
FIG. 2 is a cross-sectional view of the vacuum fluorescent display apparatus.

The vacuum fluorescent display apparatus of the present invention in which the phosphor described above is used is shown in FIG. 2. FIG. 2 is a cross-sectional view of the vacuum fluorescent display apparatus.

The vacuum fluorescent display apparatus 1 is a display device comprising phosphor layers 6 on which a plurality of oxide layers have been deposited, the phosphor layers 6 being formed on a plurality of anodes 5 in the display surface of an anode substrate 7. Electrons emitted from anodes 9 positioned above the phosphor layers 6 in a vacuum space are controlled by a plurality of grid electrodes 8 disposed between the phosphor layers 6 and the anodes 9, and the plurality of phosphor layers 6 are selectively caused to emit light.

In FIG. 2, the reference numeral 2 refers to a glass substrate, 3 refers to a wiring layer formed on the glass substrate, 4 refers to an insulation layer, 4a is a through-hole for electrically connecting the wiring layer 3 and the anode electrodes 5. The reference numeral 10 refers to a face glass, and 11 refers to a spacer glass.

EXAMPLES

Example 1 and Comparative Example 1

Using the same method as reference example 2, 400 ppm of gadolinium oxide as the oxide (MO1), which provides a brightness intensifying effect, was deposited as the first deposition layer on the $CaTiO_3$:Pr,Zn,Li phosphor main body shown in reference example 1. This phosphor was immersed in a solution obtained by diluting an organic silicon compound in ethanol, and the ethanol was evaporated off to deposit the organic silicon compound on the surface of the phosphor. The deposited organic silicon compound was heated at 400° C. to 600° C. to convert the compound into silicon oxide and obtain the second deposition layer. The amount of silicon oxide was 200 ppm with respect to the phosphor main body. The fabricated phosphor was mounted in a vacuum fluorescent display apparatus and evaluated. Lighting was carried out at an anodic voltage of 26 V and a duty of 1/12. The results are shown in Table 5. Comparative example 1 is the same as reference example 1 described above.

Examples 2 to 22

Other than using the oxides and deposition amounts shown in Table 5, phosphors were fabricated in the same manner as with example 1, and the phosphors were mounted in a vacuum fluorescent display apparatus, and evaluated, in the same manner as with example 1. The results are shown in Table 5. The deposition of the oxide (MO1) was carried out using the same method as with reference examples 2, 4, 5, and 6. Deposition of the second oxide (MO2) was carried out using the same method as with reference examples 8 to 12.

TABLE 5

| | First deposition layer | | Second deposition layer | | Initial brightness | Persistence after 1500 h |
|---|---|---|---|---|---|---|
| | Oxide (MO1) | Deposition amount | Oxide (MO2) | Deposition amount | | |
| Comparative example 1 | — | — | — | — | 100% | 53% |
| Example 1 | Gadolinium oxide | 400 ppm | Silicon oxide | 200 ppm | 103% | 74% |
| Example 2 | Gadolinium oxide | 400 ppm | Silicon oxide | 400 ppm | 95% | 86% |
| Example 3 | Gadolinium oxide | 400 ppm | Silicon oxide | 600 ppm | 87% | 88% |
| Example 4 | Gadolinium oxide | 400 ppm | Aluminum oxide | 200 ppm | 104% | 63% |
| Example 5 | Gadolinium oxide | 400 ppm | Aluminum oxide | 400 ppm | 98% | 72% |
| Example 6 | Gadolinium oxide | 400 ppm | Aluminum oxide | 600 ppm | 90% | 76% |
| Example 7 | Gadolinium oxide | 400 ppm | Molybdenum oxide | 400 ppm | 88% | 65% |
| Example 8 | Gadolinium oxide | 400 ppm | Antimony oxide | 400 ppm | 97% | 64% |
| Example 9 | Gadolinium oxide | 400 ppm | Cerium oxide | 400 ppm | 45% | 102% |
| Example 10 | Yttrium oxide | 400 ppm | Silicon oxide | 200 ppm | 103% | 70% |
| Example 11 | Yttrium oxide | 400 ppm | Silicon oxide | 400 ppm | 96% | 81% |
| Example 12 | Yttrium oxide | 400 ppm | Silicon oxide | 600 ppm | 88% | 83% |
| Example 13 | Yttrium oxide | 400 ppm | Aluminum oxide | 200 ppm | 100% | 60% |
| Example 14 | Yttrium oxide | 400 ppm | Aluminum oxide | 400 ppm | 93% | 68% |
| Example 15 | Yttrium oxide | 400 ppm | Aluminum oxide | 600 ppm | 84% | 70% |
| Example 16 | Yttrium oxide | 400 ppm | Molybdenum oxide | 400 ppm | 87% | 60% |
| Example 17 | Yttrium oxide | 400 ppm | Antimony oxide | 400 ppm | 96% | 62% |
| Example 18 | Yttrium oxide | 400 ppm | Cerium oxide | 400 ppm | 43% | 98% |
| Example 19 | Zinc oxide | 400 ppm | Silicon oxide | 400 ppm | 90% | 82% |
| Example 20 | Zinc oxide | 400 ppm | Aluminum oxide | 400 ppm | 92% | 72% |
| Example 21 | Tantalum oxide | 400 ppm | Silicon oxide | 400 ppm | 88% | 82% |
| Example 22 | Tantalum oxide | 400 ppm | Aluminum oxide | 400 ppm | 91% | 71% |

Table 5 shows that an initial brightness that is at least substantially the same as that of comparative example 1 is obtained, and the brightness persistence after 1500 hours increased, by providing a first deposition layer having a brightness intensifying effect and a second deposition layer having a protective effect.

Examples 23 to 25

Figure 3:
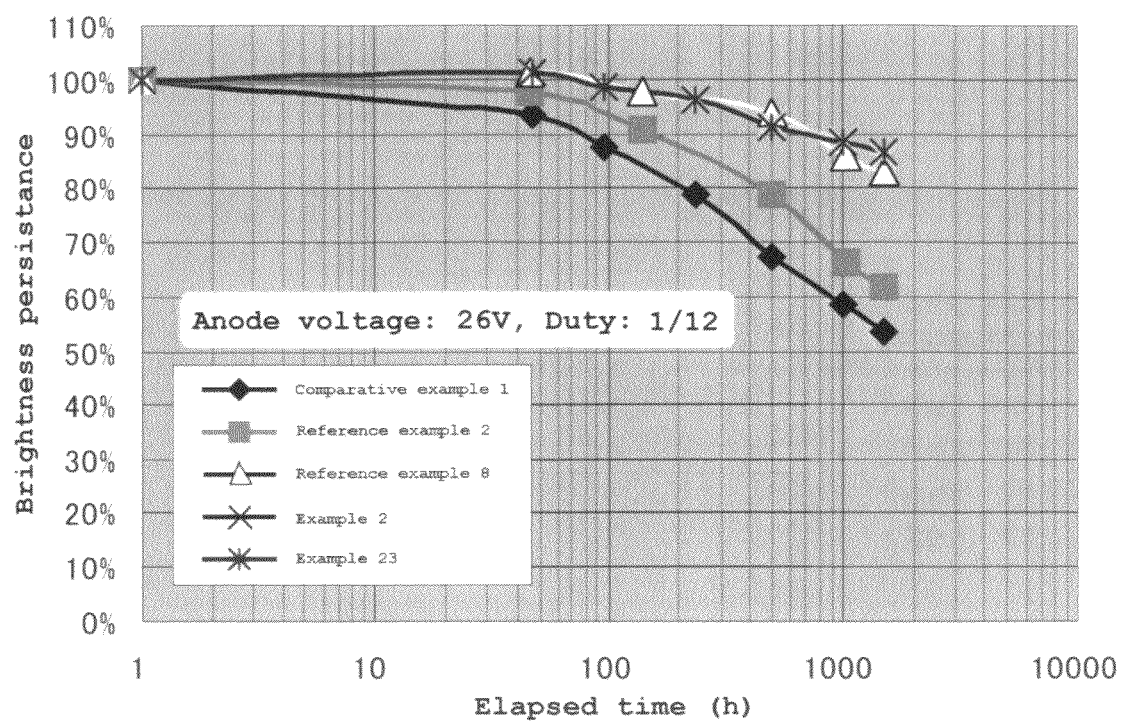
FIG. 3 is a diagram showing the brightness service life of examples 2 and 23.

Other than depositing the oxide (MO2) as the first deposition layer on the CaTiO₃:Pr,Zn,Li phosphor main body shown in reference example 1 and depositing the oxide (MO1) as the second deposition layer in sequence, phosphors were obtained using the same method as with example 1. The amount of silicon oxide was 400 ppm with respect to the phosphor, and fabrication was carried out by varying the amount of gadolinium oxide in a range of 400 to 800 ppm with respect to the phosphor. The fabricated phosphors were mounted in a vacuum fluorescent display apparatus and evaluated in the same manner as with example 1. The results are shown in FIG. 3 and Table 6. FIG. 3 simultaneously shows the results of comparative example 1, reference examples 2 and 8, and example 2.

TABLE 6

| | First deposition layer | | Second deposition layer | | Initial brightness | Persistence after 1500 h |
|---|---|---|---|---|---|---|
| | Oxide (MO2) | Deposition amount | Oxide (MO1) | Deposition amount | | |
| Comparative example 1 | — | — | — | — | 100% | 53% |
| Example 23 | Silicon oxide | 400 ppm | Gadolinium oxide | 400 ppm | 103% | 87% |
| Example 24 | Silicon oxide | 400 ppm | Gadolinium oxide | 600 ppm | 98% | 87% |
| Example 25 | Silicon oxide | 400 ppm | Gadolinium oxide | 800 ppm | 93% | 89% |

As shown in Table 6, examples 23 to 25 have the reverse oxide formation sequence of examples 1 to 3, and substantially the same characteristics as with examples 1 to 3 were obtained in terms of the initial brightness and brightness persistence after 1500 hours.

FIG. 3 shows the service life characteristics of the phosphor fabricated in example 23. Substantially the same service life characteristics were obtained as with example 2 in which the deposition layer formation sequence was different.

It is apparent from these results that the brightness intensifying layer or the protective layer may be formed first without regard to a sequence of formation, and that forming a plurality of deposition layers yields an improved effect in the initial brightness and service life characteristics.

The initial brightness is improved by the MO1, MO2 deposition layers, and the service life characteristics are improved. However, a problem is presented in that the high-temperature exposure characteristics are reduced by depositing the metal oxide. In view of the above, improvements were realized using the following method in order to prevent a reduction in the high-temperature exposure characteristics.

Example 26

An organic tungsten compound to be converted to tungsten oxide by heat treatment is deposited on a phosphor on which 400 ppm of gadolinium oxide, which has a brightness intensifying effect, has been deposited as a first deposition layer; and on which 400 ppm of silicon oxide, which has a protective effect, has been deposited as a second deposition layer on the CaTiO₃:Pr,Zn,Li phosphor main body described in reference example 1. The deposited organic tungsten compound is converted into tungsten oxide by heat treatment at 400° C. to 600°

C. to obtain a third deposition layer (protective layer). The amount of tungsten oxide deposited was 400 ppm with respect to the phosphor main body.

Figure 4:
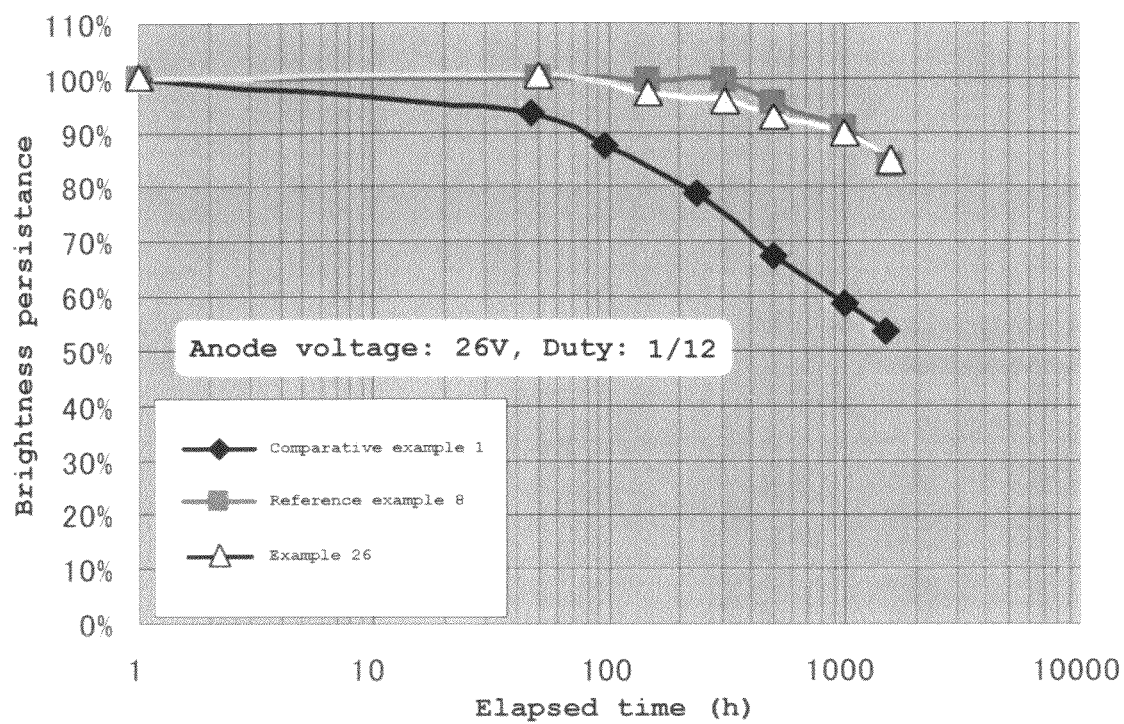
FIG. 4 is a diagram showing the brightness service life of example 26.

A vacuum fluorescent display apparatus was fabricated using the resulting phosphor, and the resulting vacuum fluorescent display apparatus was tested for initial brightness, and brightness persistence after 96 hours of residence in a temperature atmosphere of 85° C., using an anodic voltage of 26 V and a duty of 1/12. The brightness persistence is a value related to the initial brightness, which is 100%. The results are shown in FIG. 4 and Table 7.

Examples 27 to 45

Other than using the oxides and deposition amounts shown in Table 7, phosphors were fabricated in the same manner as with example 26, and were both mounted in a vacuum fluorescent display apparatus and evaluated in the same manner as with example 26. The results are shown in Table 7. Also shown are the results obtained for examples 2, 5, 11, 14, and 23 when the brightness persistence was measured after 96 hours of residence in an atmosphere set to a temperature of 85° C.

TABLE 7

| | First deposition layer | | Second deposition layer | | Third deposition layer | | Initial brightness relative to Comp. Ex. 1 | Brightness persistence after 96 h at 85° C. |
|---|---|---|---|---|---|---|---|---|
| | Oxide (MO1) | Deposition amount | Oxide (MO2) | Deposition amount | Oxide (MO3) | Deposition amount | | |
| Comparative example 1 | — | — | — | — | — | — | 100% | 79% |
| Example 2 | Gadolinium oxide | | Silicon oxide | 400 ppm | — | — | 95% | 70% |
| Example 26 | Gadolinium oxide | 400 ppm | Silicon oxide | 400 ppm | Tungsten oxide | 400 ppm | 104% | 79% |
| Example 27 | Gadolinium oxide | 400 ppm | Silicon oxide | 400 ppm | Tungsten oxide | 1000 ppm | 106% | 82% |
| Example 28 | Gadolinium oxide | 400 ppm | Silicon oxide | 400 ppm | Tungsten oxide | 3000 ppm | 102% | 85% |
| Example 29 | Gadolinium oxide | 400 ppm | Silicon oxide | 400 ppm | Titanium oxide | 1000 ppm | 104% | 87% |
| Example 30 | Gadolinium oxide | 400 ppm | Silicon oxide | 400 ppm | Zirconium oxide | 1000 ppm | 91% | 76% |
| Example 5 | Gadolinium oxide | 400 ppm | Aluminum oxide | 400 ppm | — | — | 98% | 73% |
| Example 31 | Gadolinium oxide | 400 ppm | Aluminum oxide | 400 ppm | Tungsten oxide | 400 ppm | 104% | 75% |
| Example 32 | Gadolinium oxide | 400 ppm | Aluminum oxide | 400 ppm | Tungsten oxide | 1000 ppm | 107% | 81% |
| Example 33 | Gadolinium oxide | 400 ppm | Aluminum oxide | 400 ppm | Tungsten oxide | 3000 ppm | 100% | 83% |
| Example 34 | Gadolinium oxide | 400 ppm | Aluminum oxide | 400 ppm | Titanium oxide | 1000 ppm | 102% | 85% |
| Example 35 | Gadolinium oxide | 400 ppm | Aluminum oxide | 400 ppm | Zirconium oxide | 1000 ppm | 93% | 74% |
| Example 11 | Yttrium oxide | 400 ppm | Silicon oxide | 400 ppm | — | — | 96% | 78% |
| Example 36 | Yttrium oxide | 400 ppm | Silicon oxide | 400 ppm | Tungsten oxide | 1000 ppm | 105% | 87% |
| Example 37 | Yttrium oxide | 400 ppm | Silicon oxide | 400 ppm | Titanium oxide | 1000 ppm | 104% | 87% |
| Example 38 | Yttrium oxide | 400 ppm | Silicon oxide | 400 ppm | Zirconium oxide | 1000 ppm | 94% | 78% |
| Example 14 | Yttrium oxide | 400 ppm | Aluminum oxide | 400 ppm | — | — | 93% | 68% |
| Example 39 | Yttrium oxide | 400 ppm | Aluminum oxide | 400 ppm | Tungsten oxide | 1000 ppm | 103% | 80% |
| Example 40 | Yttrium oxide | 400 ppm | Aluminum oxide | 400 ppm | Titanium oxide | 1000 ppm | 101% | 84% |
| Example 41 | Yttrium oxide | 400 ppm | Aluminum oxide | 400 ppm | Zirconium oxied | 1000 ppm | 95% | 70% |
| Example 23 | Silicon oxide | 400 ppm | Gadolinium oxide | 400 ppm | — | — | 103% | 72% |
| Example 42 | Silicon oxide | 400 ppm | Gadolinium oxide | 400 ppm | Tungsten oxide | 400 ppm | 104% | 79% |
| Example 43 | Silicon oxide | 400 ppm | Gadolinium oxide | 400 ppm | Tungsten oxide | 1000 ppm | 107% | 80% |
| Example 44 | Silicon oxide | 400 ppm | Gadolinium oxide | 400 ppm | Tungsten oxide | 3000 ppm | 103% | 83% |
| Example 45 | Silicon oxide | 400 ppm | Gadolinium oxide | 400 ppm | Titanium oxide | 1000 ppm | 106% | 84% |

As shown in Table 7, in contrast with the case in which a third deposition layer is not provided, it is apparent that the high-temperature exposure characteristics are improved for the examples in which there has been provided a third deposition layer (protective layer) is formed using an oxide (MO3) composed of tungsten oxide, titanium oxide, or zirconium oxide.

For example, FIG. 4 shows the result of measuring the brightness persistence of example 26 after 1500 hours of lighting, using the same method as with example 1. In the case of only the phosphor main body of comparative example 1, the brightness is reduced by half in 1500 to 2000 hours, but example 26 exhibited a high brightness persistence of 80% or higher for 1500 hours. It is apparent that this is substantially the same as the brightness persistence of the phosphor (reference example 8) on which silicon oxide has been deposited, and the initial brightness and service life characteristics are not affected even when a protective third deposition layer is provided. When the deposition amount of the third deposition layer (MO3) reaches 3000 ppm, the initial brightness begins to decline. These characteristics show the same tendencies in examples 29 and 30.

Examples 46 and 47

Next, examples in which only protective layers of the oxide (MO2) and the oxide (MO3) are deposited on the phosphor main body will be described.

An organic tungsten compound to be converted to tungsten oxide by heat treatment is deposited on a phosphor on which 400 ppm of silicon oxide having a protective effect has been deposited as a first deposition layer on the $CaTiO_3$:Pr,Zn,Li phosphor main body described in reference example 1. The deposited organic tungsten compound is converted to tungsten oxide by heat treatment at 400° C. to 600° C. to obtain a second deposition layer (protective layer). The amounts of tungsten oxide deposited were 1000 ppm (example 46) and 3000 ppm (example 47) with respect to the phosphor main body.

A vacuum fluorescent display apparatus was fabricated using the resulting phosphor, and the resulting vacuum fluorescent display apparatus was tested for initial brightness and brightness persistence after 96 hours of residence in a temperature atmosphere of 85° C. using an anodic voltage of 26 V and a duty of 1/12. The results are shown in Table 8.

TABLE 8

| | First deposition layer | | Second deposition layer | | Initial brightness in relation to comparative example 1 | Brightness persistence after 96 h at 85° C. |
| --- | --- | --- | --- | --- | --- | --- |
| | Oxide (MO2) | Deposition amount | Oxide (MO3) | Deposition amount | | |
| Comparative example 1 | — | — | — | — | 100% | 79% |
| Reference example 8 | Silicon oxide | 400 ppm | — | — | 86% | 66% |
| Example 46 | Silicon oxide | 400 ppm | Tungsten oxide | 1000 ppm | 84% | 80% |
| Example 47 | Silicon oxide | 400 ppm | Tungsten oxide | 3000 ppm | 82% | 83% |

As follows from Table 8, the high-temperature exposure characteristics for the case where only silicon oxide has been deposited (reference example 8) were inferior to those of the phosphor main body (comparative example 1). On the other hand, when an oxide (MO3) composed of tungsten oxide is deposited on the phosphor on which silicon oxide has been deposited, the high-temperature exposure characteristics are improved, and the resulting characteristics will be the same as or exceeding those of comparative example 1. The service life characteristics are substantially the same as those of reference example 8.

INDUSTRIAL APPLICABILITY

The phosphor of the present invention can dramatically improve service life without reducing the initial brightness, can and improve the high-temperature exposure characteristics. Therefore, the phosphor can be advantageously used in a vacuum fluorescent display apparatus in which phosphors that do not contain cadmium are used.

What is claimed is:

1. A phosphor for a low-voltage electron beam device having a coated deposition layer formed on the phosphor shown by the following chemical formula (1), $CaTiO3$:Pr,M (where M is at least one element selected from Al, Ga, In, Mg, Zn, Li, Na, K, Gd, Y and La), wherein the coated deposition layer is a plurality of oxide layers layered on a surface of the phosphor, wherein the oxide layers are layered in a sequence of oxide (MO1)-oxide (MO2)-oxide (MO3), or, oxide (MO2)-oxide (MO1)-oxide (MO3), with respect to the surface of the phosphor, wherein the oxide (MO1) is at least one element selected from Gd, Pr, Y, Zn, Ta, and Sr, wherein the oxide (MO2) is at least one element selected from Si, Al, Mo, Sb, and Ce, wherein the oxide (MO3) is at least one element selected from Ti, W, and Zr.

2. The phosphor according to claim 1, wherein the oxide (MO1) is at least one element selected from Gd and Y.

3. The phosphor according to claim 2, wherein an amount of the oxide (MO1) deposited is 200 to 2000 ppm with respect to the entire amount of the phosphor main body.

4. The phosphor according to claim 1, wherein oxide (MO2) is at least one element selected from Si and Al.

5. The phosphor according to claim 4, wherein an amount of the oxide (MO2) deposited is 50 to 2000 ppm with respect to an entire amount of the phosphor main body.

6. The phosphor according to claim 1, wherein oxide (MO3) is at least one element selected from Ti and W.

7. The phosphor according to claim 6, wherein an amount of the oxide (MO3) deposited is 400 to 3000 ppm with respect to an entire amount of the phosphor.

8. The phosphor according to claim 7, wherein the total amount of the oxide (MO2) and the oxide (MO3) deposited is 50 to 3400 ppm with respect to the entire amount of the phosphor.

9. A vacuum fluorescent display apparatus in which a low-voltage electron beam is injected into a phosphor layer for a low-voltage electron beam to cause the phosphor layer to emit light, the phosphor layer being formed inside a vacuum vessel, wherein the phosphor layer for a low-voltage electron beam is a layer of the phosphor for a low-voltage electron beam of claim 1.

10. The phosphor for a low-voltage electron beam according to claim 1, wherein the M shown by the chemical formula (1) $CaTiO_3$:Pr,M is at least one element selected from Zn and Li.

\* \* \* \* \*